Figure 5:
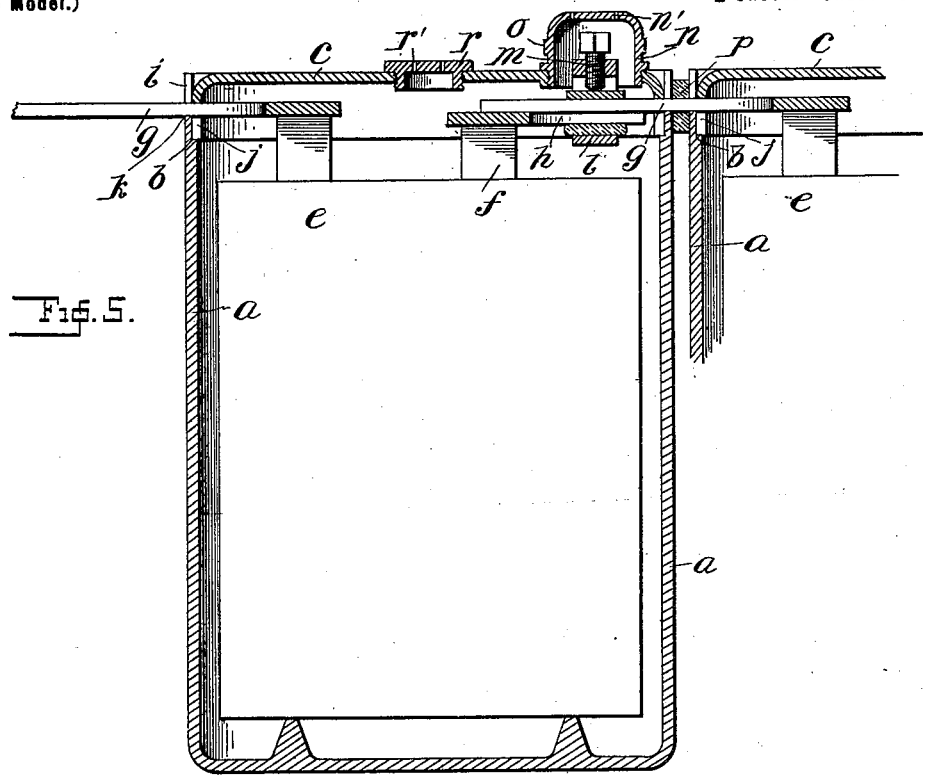

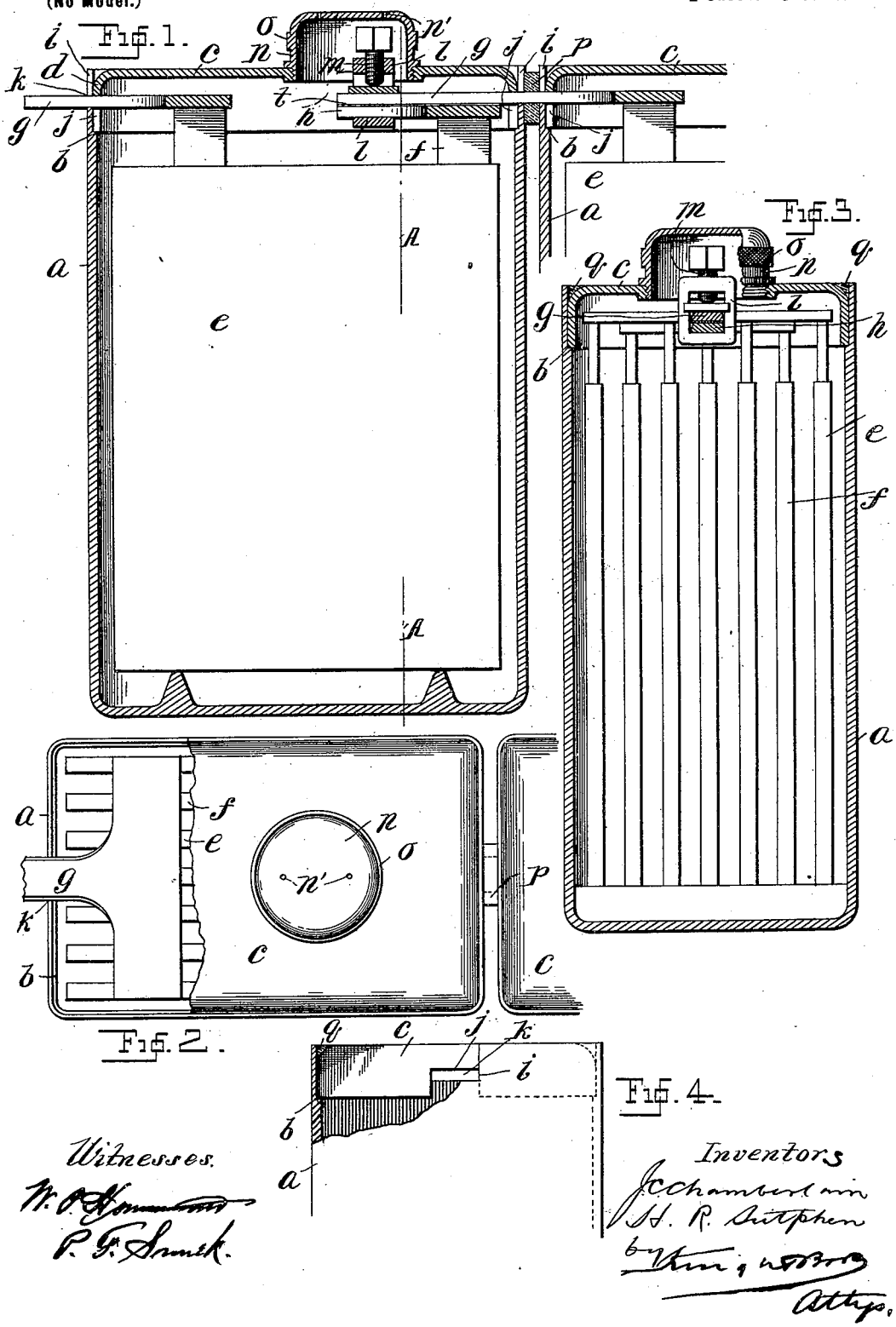

No. 673,652. Patented May 7, 1901.
J. C. CHAMBERLAIN & H. R. SUTPHEN.
STORAGE BATTERY CELL.
(Application filed Nov. 9, 1900.)
(No Model.) 2 Sheets—Sheet 2.

Witnesses. Inventors.

UNITED STATES PATENT OFFICE.

JACOB CHESTER CHAMBERLAIN, OF NEW YORK, AND HENRY R. SUTPHEN, OF HIGHBRIDGE, NEW YORK.

STORAGE-BATTERY CELL.

SPECIFICATION forming part of Letters Patent No. 673,652, dated May 7, 1901.

Original application filed September 11, 1899, Serial No. 730,076. Divided and this application filed November 9, 1900. Serial No. 35,969. (No model.)

*To all whom it may concern:*

Be it known that we, JACOB CHESTER CHAMBERLAIN, residing in New York, and HENRY R. SUTPHEN, residing in Highbridge, in the county and State of New York, citizens of the United States, have invented certain new and useful Improvements in Storage-Battery Cells, of which the following is a specification.

This invention relates to improvements in storage-battery cells, and particularly to the construction of the cell bodies or casings and the connecting devices, so as to obtain certain advantages in durability, convenience, and efficiency of the cells.

The present application is in part a division of our previous application, Serial No. 730,076, filed September 11, 1899, and in part in substitution of our application, Serial No. 701,331, filed January 6, 1899.

The object of the invention is to provide means for preventing spilling of liquid from the cell, while enabling the use of plates of unusually-large size and at the same time reducing to a minimum the vertical space required for the cells. The invention also facilitates the assembling and connection of the cells of a battery, and a further result of the invention is that corrosion of the connections and terminals is avoided.

The invention comprises means for maintaining the cells in substantially closed condition and for making the connections from cell to cell within the cell-body or interior closed space, so as to prevent spilling of liquid and maintain the said connections in a non-oxidizing atmosphere, while providing for access to the interior of the cell and the connections therein.

The practice for some years has been to have an internal shoulder about half an inch from the top of the cell and a flat cover on which rests this shoulder. The height of the cell above this flat cover is supposed to be sufficient to prevent accidental slopping of the liquid due to the motion of the vehicle or other support for the cell, and it also serves, of course, to keep the cover in place. It has been customary to seal the cell around the edge of the cover by pressing an asphaltum compound around the edge. Our present plan is to do away with this flat cover and to support upon the same internal shoulder a rounded cover. The rounded portion gives strength of an arch to the cover and also supplies a place to put in sealing compound, if necessary. We find, however, in practice that the cover made in this way can be so accurately fitted in the top of the cell as to make slopping of the liquid practically impossible, and therefore sealing unnecessary. The additional height given by the rounded or arch shape of the cover enables the use of larger plates. At one edge the cell-jar and the cover are notched to enable a flat connecting bar or strip of lead to be passed from one element to the other. The strip of one element is fastened to the T-strap of the plate in the adjacent element by a connector, provision for which is made by a hole in the cover, and this hole is covered by a screw-cap. The cover is put on after everything is connected. The said screw-cap serves to prevent the slopping of the liquid out through the hole in the top of the cover, and the connecting-strip fits the notch in the edge of the cell and cover sufficiently tight to prevent slopping of the liquid at that point. The lead of the strip being slightly compressible it makes this joint practically water-tight. The connecting-strip is slightly tapered upward to enable it to be drawn from the mold, and when the cover comes down upon it it cuts into the edge of the strip sufficiently to make the connection fairly tight. To insure absolute tightness at this point, however, we may provide a washer of rubber or other elastic material, which being slipped over the terminal strip fits tightly on same. The adjacent cells are placed so closely together that this washer is in tight contact with the walls of the cell on each side, thus not only tightly closing the joint, but giving an elastic support from cell to cell. This washer, being of insulating material, completes the insulation of the battery, so that no part of the metallic circuit is exposed.

We prefer to provide a hole in the top of the cover to enable the liquid to be replenished without removing the cover, this hole being normally covered by a screw-plug which is only provided with sufficient opening to permit of the gradual escape of gas from the cell, and said hole being preferably the same hole that gives access to the connection between the cell-terminals. As the cover fits the cell closely at all points and is closed with the exception of this small gas-outlet the result is that the interior space of the cell between the cover and the electrolyte is occupied by the gases generated by the electrolysis, and circulation of atmospheric air being prevented corrosion is prevented or greatly retarded.

With the old construction the adjacent lead strips between the two cells were always exposed and the connector was placed horizontally, so that the binding-screw had to be tightened from a horizontal position. The connector had also to be placed above the edge of the cell. In the new construction it does away with any exposed metallic parts extending above the cells, and the connector is placed in a vertical position, making the binding-screw readily accessible and so low that the entire height of the cell, with the connector, is not as great as before with a much greater height of plate. Also a much better electrical contact is obtained between the surfaces of the strips under the cover, and the same are better protected from corrosion than in the old way, where they projected above the covers and were exposed.

The electrode-terminals extend out straight in a horizontal direction from opposite sides of the cell, and the terminals of one polarity are a little higher up than those of the other polarity, so as to extend directly over and in contact with same without any bending of either set of terminals. This has the advantage that in connecting up the cells to form a battery the terminals always come naturally into their proper relative positions for contact, so that there is no danger of connecting the cells wrongly, it being only necessary to place each cell so that the terminals which are being connected overlap or are superimposed on one another without bending either terminal. A further advantage of this arrangement is that there is no bending of the terminals, and we thus avoid the formation of the cracks or fissures that usually form in the bent portions of the terminals, such fissures weakening the strip mechanically and electrically and accelerating the corrosion thereof.

In the accompanying drawings, Figure 1 is a vertical section, and Fig. 2 is a partly-broken plan view, of a cell and a portion of another cell embodying our invention. Fig. 3 is a vertical section on the line A A in Fig. 1. Fig. 4 is an end view, partly broken away, of a portion of a cell, showing the passage for the connection. Fig. 5 is a vertical section, and Fig. 6 a partly-broken plan, of a modified form of the cell. Fig. 7 is a detail sectional view showing another modification.

Referring to Figs. 1 to 4, each battery-cell comprises a cell-body $a$, having an internal shoulder $b$ near its top, and a cover $c$, having a downturned flange $d$, fitting in the top of the cell and resting on the shoulder $b$. The sets of battery-plates $e\,f$, of opposite polarity, are supported in the cell in the usual manner, and their respective terminals $g\,h$ are located in the cell-space below the cover $c$. The terminal $g$, corresponding to the plates of one polarity, extends through the wall of the cell to the outside, but the other terminal $h$ is entirely within the cell. Notches $i\,i$ are formed in the sides or the ends of the cell-body, and corresponding notches $j\,j$ are formed in the downturned flange $d$ of the cover $c$, so that when the cover is put in place these notches will overlap, leaving rectangular openings, as shown at $k$ in Fig. 4, to receive the respective terminals, which fit closely therein.

As shown in Fig. 1, the two terminals $g\,h$ both extend horizontally in the same direction, terminal $g$ extending through the opening $k$ in one side of the cell and the terminal $h$ extending from a point near the opposite side of the cell toward the middle of the cell, so that when the projecting terminal $g$ from the next cell is introduced into the cell and over and in contact with the terminal $h$ a coupling device, connector, or clamp $l$ may be slipped over the terminal ends thus placed in contact, and its binding-screw $m$ is then tightened to secure the connection. It will be seen that this connection may be uncoupled at any time without moving the cells.

A cap, dome, or turret $n$ is provided in the top of the cover $c$ to receive the top portion of connector $l$, which projects above the main body of the cell. In order to enable inspection and adjustment of this connector or generally of the battery connection and inspection and renewal of the battery fluid, this turret is made in the form of a screw-cap, screwing into the top of the cover $c$, so that it can be removed when desired, and it is provided with a knurled rim $o$ to facilitate such operation. (See Fig. 3.) Gas-outlets $n'$ are also provided in this cap to permit escape of gas, these outlets being so small that they do not admit the passage of any substantial amount of outside air into the closed cell-space.

A washer $p$, of rubber or other elastic material, is placed around the terminal $g$, where it passes out of the cell and into the next cell, the adjacent cells being placed so closely together that the said washer is tightly embraced between them, and thus effectually seals the opening through which the terminal $g$ passes, so that no liquid can spill out between the terminal and the side of the opening. The notches in the cell-wall and the cover-flange are made to fit over the terminal strip $g$ as tightly as possible, but to absolutely prevent leakage or spilling of the battery fluid these elastic packing-washers are essential.

The edge or corner of flange $d$ where it joins cover $c$ is preferably rounded, so as to give greater strength and also to leave a space, which may be filled with suitable luting, as indicated at *q* in Fig. 3. The arched or box form of the cover provides a space in the top of the cell above the plates, wherein the terminal connections are located inside the cell. This space is practically out of communication with the outer air, and in practice it will be occupied by the gases generated by the electrolysis, and circulation of atmospheric air therein being prevented corrosion is avoided or is greatly retarded.

We prefer to make the terminal strips *g h* at different heights, so that when each strip is placed horizontally the strips of one polarity will extend directly over the strips of opposite polarity and no bending of the strips will be required. This also conduces materially to the durability of the strips, as any bending of the strips tends to open cracks therein, where the corrosion will proceed more rapidly than it will in a strip with an unbroken surface. On account of this freedom from bending, of the protection of the main portion of the terminal strips by their inclosure within the cell so as to be surrounded by a non-oxidizing gas, and to the protection of the remaining part of the strips by the rubber washers *p* the corrosion of the terminals will be to a great extent prevented.

Figure 6:
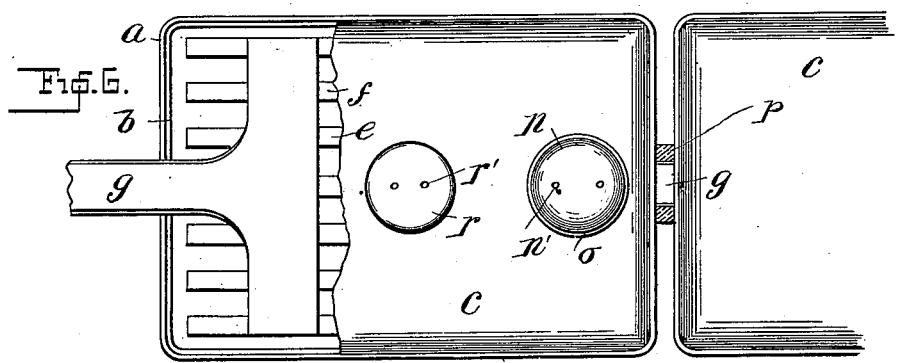
Figure 7:
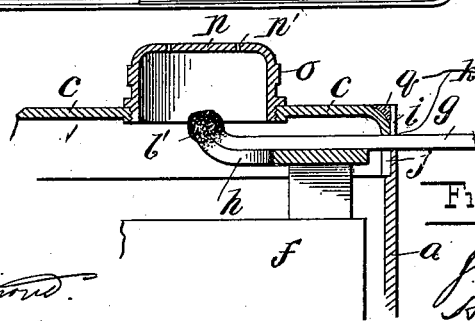

In Figs. 5 and 6 is shown a modification wherein the plate-terminals or connecting-strips are extended in opposite directions, and the connecting-strips from adjacent cells are threaded from opposte sides through the connector. The cap *n* is provided, as before, over the connector *l m*; but a separate gas-outlet and inspection plug or cap *r* is provided, screwing into the top of the cell and provided with gas-vents *r'*. In other respects the cell is the same as in Figs. 1 to 4.

Instead of using a connector for uniting the ends of the connecting-strips of adjacent cells they may be united by fusing or soldering them together, as indicated in Fig. 7, where *l'* is the union coupling or junction of the two bars, formed by fusing them together in the well-known manner. In this case the junction is, however, made, as before, directly beneath the cap *n*, and may even extend up into this cap, if desired. If repair or renewal of the connection is to be effected, it may be done by removing the cap *n*, and as the metal of the strips is exhausted in such renewals the point of fusion is displaced toward the side of the cell, but still remains accessible through the cap-hole.

The lead strips or terminals *g h* are more or less rough, and when they are coupled together by the means shown in Fig. 1 the contact is generally extended over only a portion thereof. Even with careful scraping it is not possible to force the strips into thorough contact, especially after they have become hardened by use. We therefore use a packing or calking strip *t* of soft lead, which is placed between the terminal strips, and on pressure being applied by the connector is squeezed against the terminal strip, so as to fill all depressions and hollow places and insure contact throughout.

Having thus described our invention, the following is what we claim as new therein and desire to secure by Letters Patent:

1. The combination with a battery-jar having notches in its top and having an inside shoulder, of a cover having a downturned edge fitting inside said jar and resting on said shoulder and having in its downturned edge notches registering with the notches in the jar and electrodes within said jar provided with terminals, one of which is located entirely within the space inside the cover while the other one extends through the notches in the jar and cover.

2. The combination with a battery-jar having an inside shoulder near its top, of electrodes contained in said jar, and electrode-terminals arranged in the upper part of the jar, and a connector for connecting such terminals, of a cover having a downturned edge resting on the aforesaid shoulder and having an aperture provided with a cap to receive the said connector.

3. The combination of a plurality of battery-cells having notches in their tops and each having one electrode-terminal strip located entirely within the cell and another electrode-terminal strip extending horizontally through a notch of the cell to overlap and connect with an inside terminal of the next cell, and covers having downturned edges with notches fitting over said terminal strips to substantially close the aperture, and connections for the terminals at points within the cells and below the covers.

4. The combination of a plurality of covered battery-cells, having electrode-terminals of one polarity extending from the inside of one cell to the inside of the next cell, and there making connection with the terminals of opposite polarity, each cell being covered separately from the others and having a removable cover portion giving access to the junction of the terminals, substantially as set forth.

5. The combination of a plurality of covered battery-cells, having their connections all made within the covered cells, each cell being covered separately from the others and having a removable cover portion giving access to the junction of the terminals, substantially as set forth.

6. A battery-cell having a long electrode-terminal extending outside the cell, and a short electrode-terminal which does not extend outside the cell, said battery being covered and having a removable cover portion in proximity to the short electrode-terminal, substantially as set forth.

7. A battery-cell comprising a jar, electrodes, contained therein, a connector arranged within the cell and extending above the top thereof, and a cover for the cell having an opening to receive said connector and provided with a removable cap for said opening, substantially as set forth.

8. A battery-cell comprising a jar, electrodes, contained therein, a connection arranged within the cell, and a cover for the cell having an opening above said connection and provided with a removable cap for said opening, substantially as set forth.

9. The combination with a plurality of battery-cells each having a terminal strip extending through its side into the adjacent cell, of elastic washers surrounding the said strips and interposed between the adjacent cells.

10. The combination of a plurality of battery-cells, arranged end to end, with their opposite terminals extending in the same direction, one terminal of a cell being located altogether within the cell, and the other terminal extending into the next cell to overlap the terminal therein, and coupling-clamps located within the cells for connecting the terminals.

11. The combination of a plurality of battery-cells, arranged end to end, with their opposite terminals extending in the same direction, one terminal of a cell being located altogether within the cell and the other terminal extending into the next cell to overlap and connect with a terminal therein, couplings for connecting the terminals at a point within the cells, and covers covering the cells, and the couplings of the terminals within the cell.

12. The combination of a plurality of battery-cells, arranged end to end, with their opposite terminals extending in the same direction, one terminal of a cell being located altogether within the cell and the other terminal extending into the next cell to overlap and connect with a terminal therein, couplings for connecting the terminals at a point within the cells, and covers covering the cells, and the couplings of the terminals within the cell, and having removable caps over said couplings.

13. In a storage battery, the combination with the terminal strips and connector embracing same, of a soft-lead packing-strip interposed between the terminal strips.

JACOB CHESTER CHAMBERLAIN.
HENRY R. SUTPHEN.

Witnesses:
A. P. KNIGHT,
J. GREEN.